(12) United States Patent
Wiker et al.

(10) Patent No.: US 12,337,431 B2
(45) Date of Patent: Jun. 24, 2025

(54) SAFETY BRAKE DEVICE

(71) Applicant: Robert Bosch GmbH, Stuttgart (DE)

(72) Inventors: Juergen Wiker, Stuttgart (DE); Daniel Dennis, Nuertingen (DE); Florian Esenwein, Leinfelden-Echterdingen (DE); Dhananjay Raghunath Zinge, Maharashtra (IN)

(73) Assignee: Robert Bosch GmbH, Stuttgart (DE)

( * ) Notice: Subject to any disclaimer, the term of this patent is extended or adjusted under 35 U.S.C. 154(b) by 656 days.

(21) Appl. No.: 17/275,778

(22) PCT Filed: Sep. 20, 2019

(86) PCT No.: PCT/EP2019/075282
§ 371 (c)(1),
(2) Date: Mar. 12, 2021

(87) PCT Pub. No.: WO2020/064526
PCT Pub. Date: Apr. 2, 2020

(65) Prior Publication Data
US 2022/0055167 A1    Feb. 24, 2022

(30) Foreign Application Priority Data
Sep. 27, 2018   (DE) ................ 10 2018 216 572.6

(51) Int. Cl.
*B23Q 11/00* (2006.01)
*B25F 5/00* (2006.01)
(Continued)

(52) U.S. Cl.
CPC ............ *B23Q 11/0092* (2013.01); *B25F 5/00* (2013.01); *F16D 63/006* (2013.01); *F16D 65/14* (2013.01); *F16D 2121/20* (2013.01)

(58) Field of Classification Search
CPC ....... B23Q 11/0092; B25F 5/00; F16D 65/14; F16D 2121/20
See application file for complete search history.

(56) References Cited

U.S. PATENT DOCUMENTS

| 4,279,180 A | 7/1981 | Tomlinson et al. |
|---|---|---|
| 2010/0147123 A1* | 6/2010 | Baumann ............... F16D 55/04 83/571 |

(Continued)

FOREIGN PATENT DOCUMENTS

| CN | 102958727 A | 3/2013 |
|---|---|---|
| CN | 103987493 A | 8/2014 |

(Continued)

OTHER PUBLICATIONS

Parmley, Robert, Illustrated Sourcebook of Mechanical Components, 2000, McGraw-Hill, 4-60 (Year: 2000).*

(Continued)

*Primary Examiner* — Jonathan G Riley
(74) *Attorney, Agent, or Firm* — Maginot, Moore & Beck LLP

(57) ABSTRACT

A safety brake device for braking a machining tool includes at least one brake device configured as an at least two-part claw clutch. The claw clutch includes a first claw-clutch part, and a second claw-clutch part. The first claw-clutch part is arranged on the output shaft so as to allow no relative rotation, the second claw-clutch part is configured to allow no relative rotation with respect to the power tool, each claw-clutch part has a respective plurality of toothing elements, the respective plurality of toothing elements are configured to engage with one another during a braking operation to stop rotation of the output shaft, and a maximum angular spacing Δmax of mutually adjacent toothing elements of at least one of the first plurality of toothing (Continued)

Figure 1:
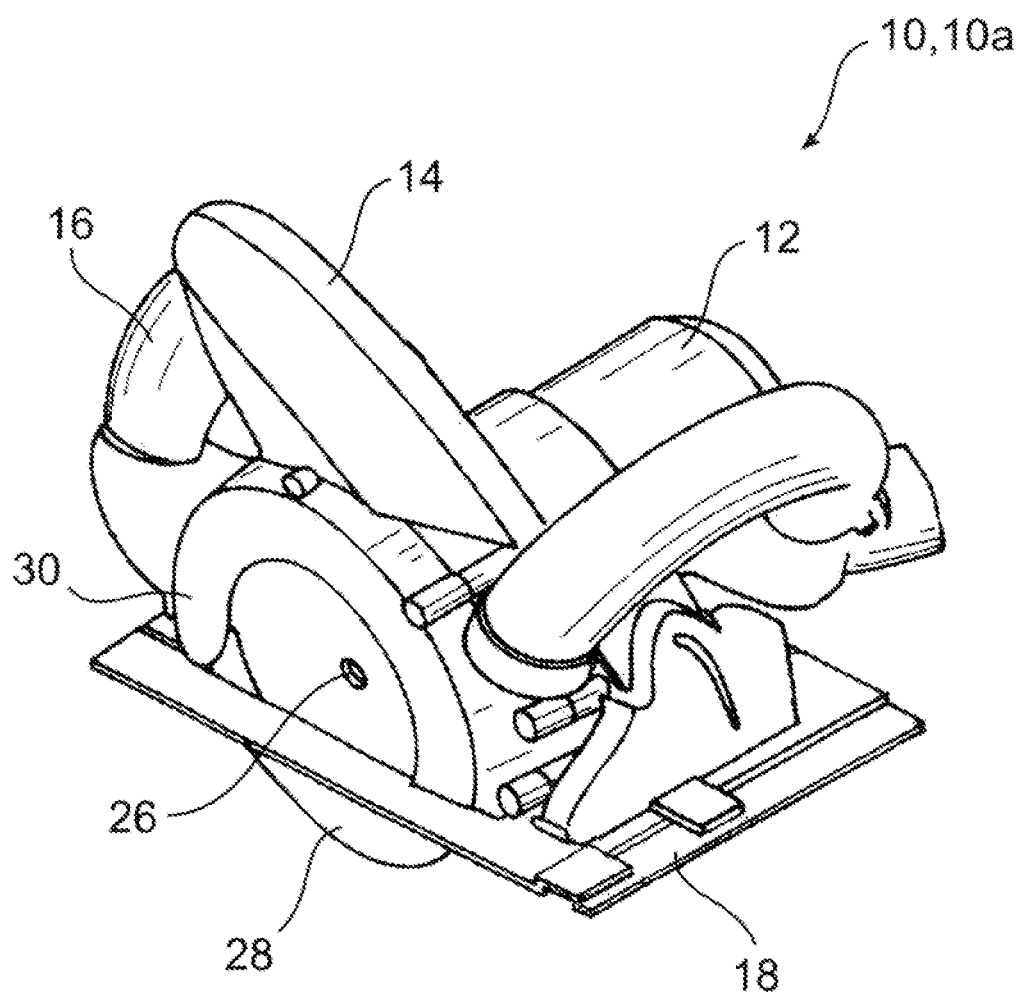

elements an the second plurality of toothing elements is determined depending on a maximum rotational speed of the output shaft.

10 Claims, 3 Drawing Sheets

(51) Int. Cl.
    *F16D 63/00*     (2006.01)
    *F16D 65/14*     (2006.01)
    *F16D 121/20*     (2012.01)

(56) References Cited

U.S. PATENT DOCUMENTS

| | | | | |
|---|---|---|---|---|
| 2014/0090517 | A1* | 4/2014 | Suzuki | B23Q 16/06 |
| | | | | 74/814 |
| 2014/0090860 | A1* | 4/2014 | Ramaswamy | G01R 29/26 |
| | | | | 324/614 |
| 2015/0107955 | A1* | 4/2015 | Tronnberg | F16D 11/10 |
| | | | | 192/69.8 |
| 2015/0283630 | A1* | 10/2015 | Gass | B23D 45/067 |
| | | | | 83/477.1 |
| 2016/0008997 | A1* | 1/2016 | Gass | B27G 19/02 |
| | | | | 83/58 |
| 2018/0036812 | A1 | 2/2018 | Frolov et al. | |
| 2018/0036853 | A1* | 2/2018 | Frolov | B23D 59/002 |

FOREIGN PATENT DOCUMENTS

| | | |
|---|---|---|
| DE | 10 2008 054 694 A1 | 6/2010 |
| DE | 10 2011 119 294 A1 | 5/2013 |
| DE | 10 2015 015 465 A1 | 6/2017 |
| GB | 332302 A | 7/1930 |
| GB | 957890 A | 5/1964 |
| JP | 2007-187247 A | 7/2007 |
| JP | 2016-101617 A | 6/2016 |
| WO | 2008/019931 A1 | 2/2008 |

OTHER PUBLICATIONS

International Search Report corresponding to PCT Application No. PCT/EP2019/075282, mailed Dec. 12, 2019 (German and English language document) (5 pages).

* cited by examiner

SAFETY BRAKE DEVICE

This application is a 35 U.S.C. § 371 National Stage Application of PCT/EP2019/075282, filed on Sep. 20, 2019, which claims the benefit of priority to Serial No. DE 10 2018 216 572.6, filed on Sep. 27, 2018 in Germany, the disclosures of which are incorporated herein by reference in their entirety.

The disclosure relates to a safety brake device for a power tool.

BACKGROUND

Safety brake devices are known from the prior art, for example from DE 10 2008 054 694 A1.

SUMMARY

The disclosure proceeds from a safety brake device for a power tool for braking a machining tool driven by means of a motor via a shaft when a user approaches or comes into contact with the machining tool. The safety brake device has at least one brake device which is configured as an at least two-part claw clutch (or equivalent: claw brake) with a first claw-clutch part and a second claw-clutch part, wherein the first claw-clutch part is arranged on the shaft so as to allow essentially no relative rotation, in particular also so as to be axially movable, and wherein the second claw-clutch part is provided to be arranged so as to allow essentially no relative rotation, in particular so as to be substantially immovable, with respect to the power tool, and the first claw-clutch part and the second claw-clutch part each have more than one toothing element, wherein the toothing elements are provided to engage with one another during a braking operation and in such a way to brake, in particular stop or block, rotation of the shaft.

A "safety brake device" is intended to be understood in particular as being a device that brakes or stops a machining tool by means of at least the brake device in a situation in which the machining tool represents a hazard to a user. In particular, the safety brake device brakes the machining tool when a user approaches or comes into contact with the machining tool. In one embodiment, the safety brake device also comprises a processing unit and a sensor unit, wherein the processing unit communicates with at least one sensor of the sensor unit, wherein the sensor is provided to detect a hazard to a user, in particular the user approaching the machining tool and/or the user coming into contact with the machining tool. Electronics of the safety brake device can then, following detection of the user approaching the machining tool and/or following detection of the user coming into contact with the machining tool, trigger for example an actuator element, which triggers a braking operation using the brake device. The actuator element can be realized in particular as a constituent of the brake device or separately therefrom. The actuator element can, in one exemplary embodiment, be in the form of a lifting unit, which actively moves at least one of the two claw-clutch parts of the claw clutch in order to engage the two claw-clutch parts with one another during a braking operation and in this way to brake, in particular stop, rotation of the shaft. Such actuator elements are known to a person skilled in the art from the prior art. Active movement of at least one of the at least two claw-clutch parts can be realized in this case for example by a lever element, a spring element, a transmission element or the like.

The term "provided" is intended to be understood in particular as meaning especially equipped, designed and/or programmed.

A "power tool" is intended to be understood as meaning in principle any power tool that has a rotatably mounted machining tool driven by means of a motor via a shaft, in particular an output shaft. The machining tool can also be realized in particular as a tool receptacle. The machining tool is connected to the output unit so as to allow essentially no relative rotation or is connectable to the output unit so as to allow essentially no relative rotation at least in an operating state of the power tool, for example via a tool receptacle, such that a torque is transmissible from the output unit, in particular the output shaft, to the machining tool. The expression "so as to allow essentially no relative rotation" should be understood at this point as meaning that the machining tool executes a relative rotation of less than 15°, in particular of less than 10°, very particularly of less than 5°, with respect to the output unit during a braking operation. The torque is generated by a drive unit, for example an electric motor, in particular a brushless DC motor (EC motor), and/or some other motor that appears appropriate to a person skilled in the art. The shaft, in particular the output shaft, can be connected to the drive unit using a transmission or a clutch or without such connecting elements. Examples of such power tools include in particular drilling machines, string trimmers, lawnmowers, circular saws, bench saws, cross-cut saws, miter saws, or other power tools that appear appropriate to a person skilled in the art. In one embodiment, the power tool can be realized as a portable power tool, for example a cordless battery-operated portable circular saw or the like. In one embodiment, the power tool can be realized as a portable circular saw having a machining tool in the form of a circular-saw blade that is driven by means of a motor via a shaft, and having a sensor plate that senses contact of human skin with the machining tool.

A "shaft", in particular an output shaft, allows the machining tool to rotate by rotation of the shaft about its (axial) longitudinal axis. Typically, all other degrees of freedom, in particular a movement in a radial direction of a circular cross section of the shaft or in an axial direction of the shaft, are prevented by the design.

A "brake device" should be understood as being a device that serves to brake or stop the rotation of the machining tool in the event of detection of a user approaching or coming into contact with the machining tool. The brake device is realized according to the disclosure as an at least two-part claw clutch (or equivalent thereto: claw brake). A "two-part claw clutch" should be understood as being a clutch that functions by form-fitting coupling in that toothing elements on the two brake device parts are brought into engagement with one another and thus allow torque transmission as a consequence of a relative movement of the two claw-clutch parts with respect to one another, in particular as a consequence of a relative movement of the two claw-clutch parts in a direction of rotation with respect to one another. As a result of the safety brake device being realized by means of a claw clutch, a form-fitting connection can be used to carry out a braking operation in a particularly quick and safe manner. The first claw-clutch part is arranged on the shaft, in particular on the output shaft, so as to allow essentially no relative rotation. In one embodiment, the first claw-clutch part can be arranged on the output unit in an axially movable manner or, in a further embodiment, in an axially immovable manner. The second claw-clutch part is provided to be connected to another constituent of the power tool, in particular for example a housing, a transmission housing, a motor housing or some other structure of the power tool, so as to allow essentially no relative rotation, and thus to be arranged at least so as to allow essentially no relative rotation with respect to the power tool. In one embodiment, the second claw-clutch part can be provided to be connected to the other constituent of the power tool in a substantially immovable manner and therefore to be arranged not only so as to allow essentially no relative rotation with respect to the power tool. In one exemplary embodiment, the second claw-clutch part is embodied in a substantially immovable manner with respect to a motor housing of the power tool. In this way, in particular free rotation of the second claw-clutch part with respect to the power tool and also with respect to the shaft, in particular with respect to the output shaft, and thus with respect to the first claw-clutch part, which is connected to the shaft so as to allow essentially no relative rotation, can be prevented.

The expression "so as to allow essentially no relative rotation" should be understood as meaning that a respective claw-clutch part is mounted so as not to be substantially displaceable (rotatable) or able to slide in the direction of the circumference of the shaft, in particular of the output shaft. The expression "the first claw-clutch part is arranged on the shaft so as to allow essentially no relative rotation" should be understood as meaning that the first claw-clutch part is connected to the shaft, in particular the output shaft, so as to corotate with a rotational movement of the shaft, in particular of the output shaft, wherein "substantially" means that a maximum relative movement of the shaft and first claw-clutch part with respect to one another is intended to be allowed, which is less than 15°, in particular less than 10°, very particularly less than 5°. In one exemplary embodiment, the maximum admissible relative movement of the first claw-clutch part is 12.5°. In particular, this relative movement occurs only when a very large torque is applied to the first claw-clutch part, as can occur in the case of an abrupt braking operation.

The expression "the second claw-clutch part is arranged so as to allow essentially no relative rotation with respect to the power tool" should be understood as meaning that a maximum relative movement of the constituent of the power tool to which the second claw-clutch part is fastened, and of the second claw-clutch part with respect to one another is intended to be allowed, which is less than 30°, in particular less than 10°, very particularly less than 5°. In one exemplary embodiment, the maximum admissible relative movement of the second claw-clutch part is 15°.

The expression "axially movable/immovable" should be understood as meaning that the first claw-clutch part is mounted so as to be movable or immovable, respectively, in the axial direction of the shaft, in particular of the output shaft.

"Toothing elements" should be understood as being design-related protrusions both of the first claw-clutch part and of the second claw-clutch part, which are provided to be brought into engagement with one another. Here, the toothing elements of one claw-clutch part form at the same time recesses that receive toothing elements of the other claw-clutch part such that, upon interaction of the claw-clutch parts, protrusions (toothing elements) and recesses (depressions between adjacent toothing elements) form pairs that are arranged in a complementary manner to one another. The toothing elements are brought into engagement in the event of a braking operation such that, as a result of torque transmission between the (corotating) first claw-clutch arranged so as to allow essentially no relative rotation with the shaft and the second claw-clutch part arranged on the power tool so as to allow at least essentially no relative rotation with respect to the shaft, torque transmission is able to be generated, which counteracts the rotational movement of the first claw-clutch part and in this way brakes, in particular brakes or stops, the rotation of the shaft. In one embodiment, the toothing elements are provided equidistantly and in particular in such a way on the respective claw-clutch part that—with respect to the axis of rotation of the shaft, in particular of the output shaft—they are arranged in a rotationally symmetric manner thereto. In this way, an angular spacing $\Delta$ between adjacent toothing elements can be defined, wherein the angular spacing $\Delta$ represents the angle $\Delta$, observed from the axis of rotation of the shaft, between these two toothing elements. If two toothing elements are arranged for example opposite one another—with respect to the axis of rotation of the shaft—on a claw-clutch part, their angular spacing $\Delta$ is 180°. In the case of an angular spacing of 360°, a claw-clutch part thus has only one toothing element, whereas in the case of a respective angular spacing of 180° there are two toothing elements and in the case of a respective angular spacing of 40° there are nine toothing elements.

The disclosure is based on the finding that, when designing the brake device of the safety brake device, a number and distribution of the toothing elements—in particular with respect to a substantially circular circumference of a respective claw-clutch part (defined by the direction of revolution of the toothing elements upon rotation of a claw-clutch part)—is of significant importance, in order to achieve specifications of a maximum tolerable reaction time of the brake device (braking time).

In particular, the angular spacing $\Delta$ between adjacent toothing elements should be chosen to be as small as possible for it to be possible to provide a large number of toothing elements. The large number of toothing elements makes it possible to reduce the rotational angle about which the shaft together with the first claw-clutch part has to rotate until two toothing elements of the first and the second claw-clutch part are engaged. The small rotational angle corresponds to a short braking duration $\Delta t$ (i.e. maximum tolerable braking duration or reaction time) until the two claw-clutch parts have been brought into engagement during a braking operation. However, a large number of toothing elements also causes a small width of the toothing elements (in the direction of revolution) and thus reduced stability of the toothing elements. In particular, a width of the toothing elements that is too small can result in a manufacturing process no longer being able to be carried out economically and/or in the toothing elements deforming or even breaking during a braking operation. An optimized arrangement in terms of number, angular spacing and width of the toothing elements is therefore desirable.

According to the disclosure, a maximum angular spacing $\Delta_{max}$ of mutually adjacent toothing elements of the first claw-clutch part and/or of the second claw-clutch part is determined depending on a maximum rotational speed of the shaft, in particular of the output shaft. The "maximum angular spacing $\Delta_{max}$" denotes in this case the greatest observable spacing of two adjacent toothing elements—with respect to the axis of rotation of the corresponding claw-clutch part and thus with respect to the axis of rotation of the shaft, in particular of the output shaft. The "maximum rotational speed" of the shaft, in particular of the output shaft, is a parameter that is defined by the design and parameterization of the power tool. For example, the maximum rotational speed of an exemplary portable circular saw is 5000 revolutions per minute (rpm, corresponding to 83.3 revolutions per second (rps)). Thus, a brake device of the safety brake device, said brake device being adapted specifically and particularly to the parameterization or design of the power tool, is proposed. In this case, the maximum angular spacing $\Delta_{max}$ of two adjacent toothing elements defines a maximum braking time in the sense of a maximum "engagement time" of the toothing elements during a braking operation, i.e. the time that passes until two toothing elements are engaged after a braking operation has been triggered and act counter to one another such that a further rotation of the shaft, in particular of the output shaft, is braked or blocked. A large number of toothing elements causes a relatively small angular spacing between the individual toothing elements (around the circumference of the claw-clutch part). Consequently, it is also possible for the toothing elements to have only a small material thickness in the direction of rotation (i.e. in the circumferential direction of the claw-clutch part).

In one embodiment according to the disclosure of the safety brake device, the maximum angular spacing $\Delta_{max}$ of mutually adjacent toothing elements of the first claw-clutch part and/or of the second claw-clutch part is given in accordance with the function $\Delta_{max}=rps\cdot 360°\cdot \Delta t$. In this case, the maximum angular spacing (in the circumferential direction) is definable according to the disclosure in a manner dependent on the maximum rotational speed rps and on a predefined braking duration $\Delta t$ that is to be tolerated in particular at a maximum. In one embodiment, $\Delta t \leq 5$ milliseconds, in particular $\Delta t \leq 3.0$ milliseconds, very particularly $\Delta t \leq 1.5$ milliseconds. In one exemplary embodiment, $\Delta t \leq 2.8$ milliseconds. In this way, a particularly quickly reacting brake device of the safety brake device can be realized. For example, for an exemplary maximum rotational speed of 83.3 rps (here: per second—corresponding to 5000 rpm) of a portable circular saw and a tolerated maximum braking duration of $\Delta t \leq 1$ millisecond, a maximum angular spacing $\Delta_{max}$ of mutually adjacent toothing elements of less than or equal to 30° results. The braking durations $\Delta t$ that are to be tolerated at a maximum relate only to the interaction time of the two claw-clutch parts, but do not take further time slices-as arise for example from deceleration caused by triggering the actuator element-into consideration. It is only with the abovementioned short braking durations that satisfactory total braking times (including all time slices from contact, i.e. including decelerations cause by sensors, actuators and the actual braking duration $\Delta t$) of the power tool can be achieved, which are less than 10 milliseconds, in particular less than 7 milliseconds, very particularly less than 5 milliseconds. It should be noted that the time specifications are each specifications without manufacturing tolerances.

In one embodiment according to the disclosure of the safety brake device, the number a of the toothing elements of the first claw-clutch part and/or of the second claw-clutch part is given in accordance with the function $$\alpha = \sqrt[\gamma]{\varepsilon/rpm},$$

with the maximum rotational speed rpm (here: per minute) and the constants $\gamma$ and $\varepsilon$, wherein in particular $\gamma > 1.2$ and $\varepsilon > 80\,000$, preferably $\gamma > 1.5$ and $\varepsilon > 170\,000$, and particularly preferably $\gamma > 1.7$ and $\varepsilon > 300\,000$. In this way, a preferred ratio of the toothing elements can be specified depending on the maximum rotational speed and the desired (i.e. maximum tolerable) braking duration $\Delta t$.

The following table collates preferred numbers of toothing elements depending on a maximum rotation speed rpm (rounded values):

| rpm | suitable | preferred | particularly preferred |
|---|---|---|---|
| 2500 | 12 | 14 | 16 |
| 5000 | 8 | 10 | 12 |
| 10 000 | 4 | 6 | 8 |
| 20 000 | 3 | 4 | 5 |
| 30 000 | 2 | 3 | 4 |

In one embodiment according to the disclosure of the safety brake device, the ratio of the number a of the toothing elements of the first claw-clutch part and of the second claw-clutch part (or vice versa) is an integer, in particular 1 or 2 or 3. In an alternative embodiment, this ratio can be 4 or 5. In particular, ratios other than 1 make it possible to allow in particular manufacturing-related deviations. For example, it can be necessary, for production reasons, for the claw-clutch parts to have different numbers of toothing elements on account of different production processes (forging, extrusion, sintering, etc.).

In one embodiment according to the disclosure of the safety brake device, a maximum width B (as seen in the circumferential direction) of the toothing elements of the first claw-clutch part and/or of the second claw-clutch part is determined depending on the number of the toothing elements. In particular, the maximum width $\beta$ of the toothing elements (i.e. ascertained in the direction of revolution) of the first claw-clutch part and/or of the second claw-clutch part is given in accordance with the function $\beta = \theta \cdot \alpha^{-\sigma}$, wherein in particular $\theta \cong 218$ and $\sigma \cong 1.311$. Thus, it is possible for the toothing elements to have an advantageous width that is able to be realized easily in a production process. Furthermore, it is possible to ensure that the width of the toothing elements is chosen such that, with a preferred number of the toothing elements, the width thereof is not chosen to be too small, such that it is possible to avoid any breaking of the toothing elements during a braking operation.

The following table collates preferred widths of toothing elements depending on the number thereof (rounded values):

| Number | Width [°] |
|---|---|
| 8 | 15.0 |
| 12 | 8.7 |
| 16 | 5.8 |
| 20 | 4.1 |
| 24 | 3.2 |
| 28 | 2.6 |
| 32 | 2.3 |
| 36 | 2.1 |
| 40 | 2.0 |

As a result of the design according to the disclosure of the safety brake device in terms of a number and distribution of the toothing elements, which are brought into engagement during a braking operation, depending on the rotational speed of an output shaft of a power tool in which the safety brake device is used, a particularly advantageous braking action or braking effectiveness can be achieved taking the robustness, reaction time, braking time etc. of the brake device into consideration. In particular, on account of the configuration according to the disclosure of the brake device of the safety brake device, particularly high braking effectiveness, i.e. a particularly short time between the braking operation being triggered and the standstill of the machining tool, can be achieved in a structurally particularly simple manner. The brake device reacts particularly quickly after the actuator element has been triggered, in order to avoid or entirely rule out injuries to the operator in the event of encroachment into the moving machining tool. Furthermore, the brake device of the safety brake device can be realized in a structurally particularly simple manner and therefore also in a particularly reliable manner.

Furthermore, the disclosure relates to a power tool, in particular a portable power tool, in particular a portable circular saw having a machining tool in the form of a circular-saw blade, comprising a safety brake device according to the disclosure. In this way, in order to brake a movement, in particular a rotation, of the machining tool, a particularly short braking time, ascertained between triggering of a braking operation and the stopping of the machining tool (=engagement time of the claw clutch), is achieved. In particular, this maximum braking time $\Delta t \leq 5$ milliseconds, in particular $\Delta t \leq 3.0$ milliseconds, very particularly $\Delta t \leq 1.5$ milliseconds. Thus, the safety of a user of the power tool can be increased considerably.

In one exemplary embodiment of the power tool, the latter also has a sensor plate, which detects a user approaching or coming into contact with the machining tool, in particular contact of human skin with the machining tool. Following detection of a user approaching or coming into contact with the machining tool, electronics of the power tool energize the actuator element, which triggers a braking operation. In one exemplary embodiment, the actuator element can be in the form of a lifting unit, which actively moves at least one of the two claw-clutch parts of the claw clutch in order to bring the two claw-clutch parts into engagement with one another during a braking operation and in this way stop, in particular block, rotation of the shaft. Here, a "lifting unit" is understood to be one or more elements which, upon application of activation energy, for example in the form of electric current, are capable of abruptly expanding axially and abruptly axially moving, in particular in less than 5 milliseconds, at least one claw-clutch part of the claw clutch in order to bring the two claw-clutch parts into engagement with one another. Such lifting units or other actuator elements are known to a person skilled in the art from the prior art.

DRAWINGS

The disclosure is explained in more detail in the following description by way of exemplary embodiments illustrated in the drawings. The drawings, the description and the disclosure contain numerous features in combination. A person skilled in the art will expediently also consider the features individually and combine them to form useful further combinations. Identical reference signs in the figures denote identical elements.

Figure 2:
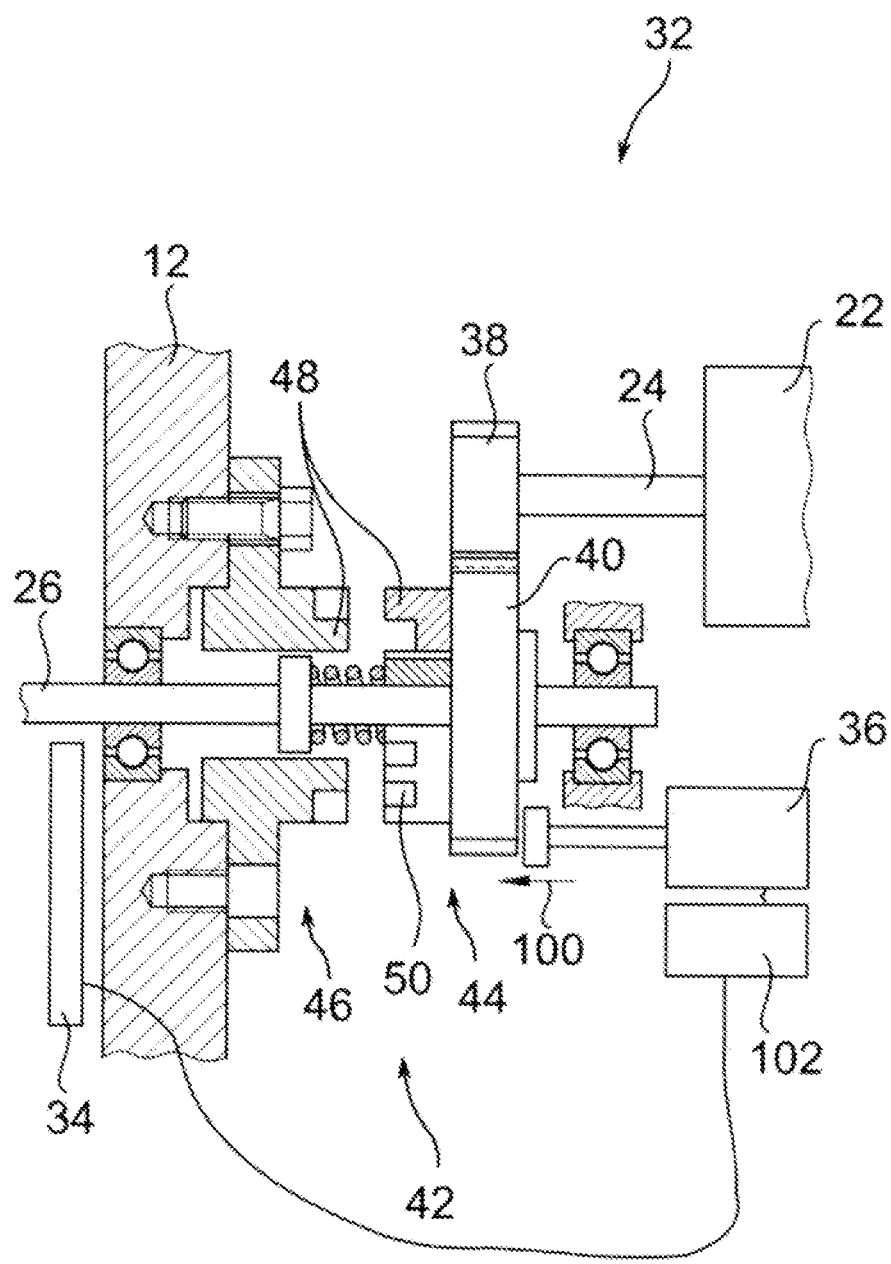
Figure 3:
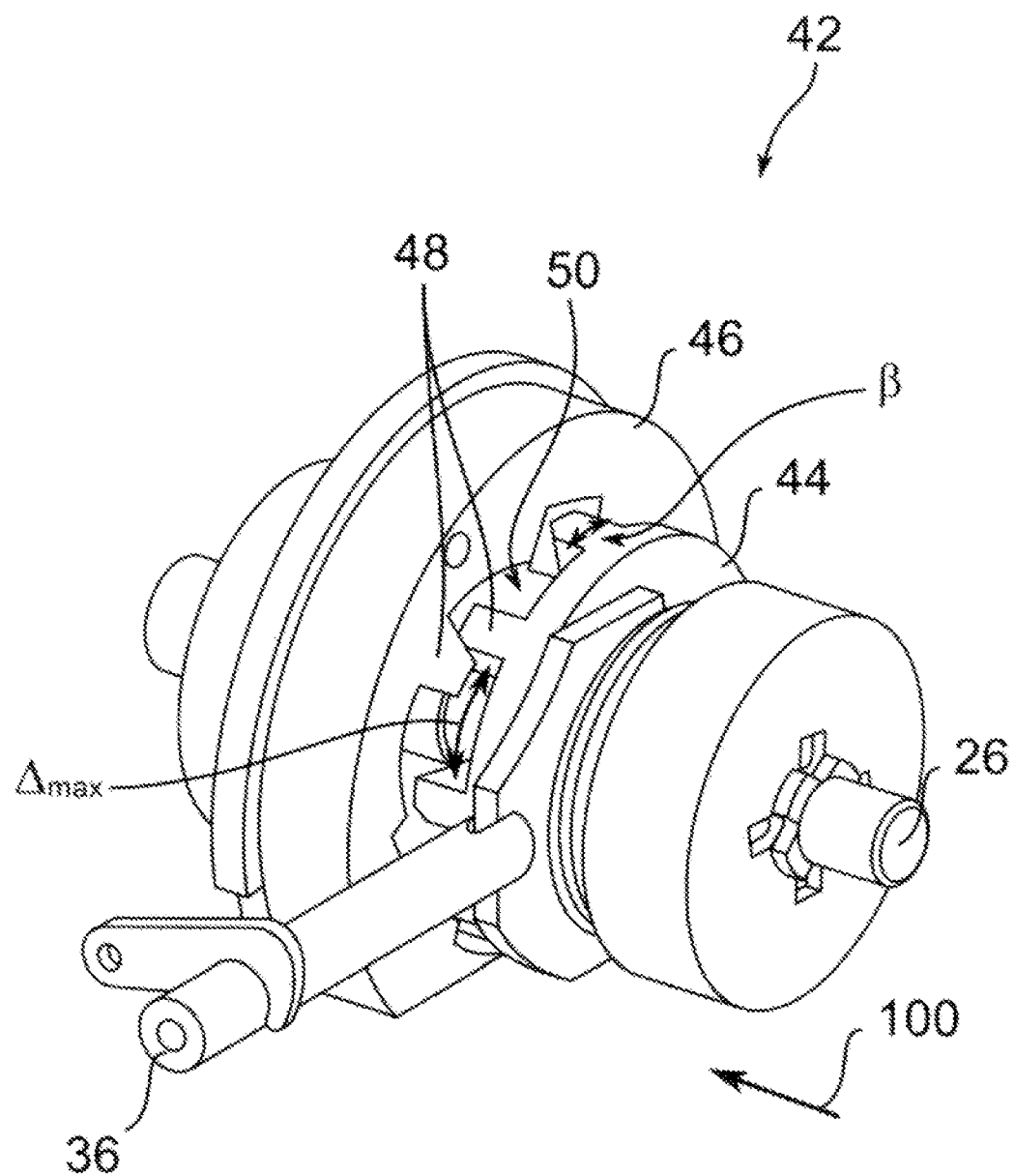

In the figures:

FIG. 1: shows a perspective illustration of a power tool according to the disclosure, FIG. 2: shows a schematic illustration of a sectional illustration through parts of the power tool together with a safety device according to the disclosure and brake device, FIG. 3: shows a schematic illustration of a brake device according to the disclosure.

DETAILED DESCRIPTION

FIG. 1 shows a power tool 10 according to the disclosure, which is realized as a portable circular saw 10a. It should be noted that the embodiments should not be understood as being limited to a portable circular saw 10a, but rather the technical teachings underlying the embodiments are also transferable in principle to any other power tools that appear appropriate to a person skilled in the art, in particular for example drilling machines, lawnmowers, string trimmers or the like.

The portable circular saw 10a comprises a first housing, which is in the form of a motor housing 12, and a second housing 14. The portable circular saw 10a has a handle 16 and a base plate 18 for guiding the portable circular saw 10a. To be supplied with energy, the portable circular saw 10a has a grid connection (not illustrated in more detail here). In an alternative or additional embodiment of the portable circular saw 10a, operation of the portable circular saw 10a independently of the power grid can also be provided using a rechargeable battery.

The motor housing 12 encloses an interior in which at least one motor 22 in the form of an electric motor drive is arranged. As illustrated in FIG. 2, the motor 22 drives a machining tool 28 (cf. FIG. 1) in rotation during a work operation via a motor shaft 24 and a shaft 26, in particular an output shaft. The machining tool 28 is in the form of a saw blade, in particular of a circular saw blade, here. A saw blade cover 30 prevents contact from being made with the machining tool 28 and provides protection from chips of a workpiece that are thrown out by the machining tool 28 (cf. FIG. 1).

A safety brake device 32 is provided for braking the machining tool 28 as soon as contact or proximity of a human body part, for example a hand, is detected by a sensor 34 of the portable circular saw 10a. The sensor 34 is realized by a capacitively measuring sensor in this exemplary embodiment. The sensor 34 makes it possible to detect a body part approaching the machining tool 28 on the basis of capacitive measurements (for example by means of an alternating field), wherein, following detection, a detection signal is generated and output to a control device of the portable circular saw 10a (cable connection in FIG. 2 between sensor 34 and electronics 102).

The safety brake device 32 comprises an actuator element 36, which is provided to trigger a braking operation following detection of a human body part coming into contact with or approaching the machining tool 28. Here, triggered by the reception of the detection signal from the sensor 34, electronics 102 (not illustrated in more detail here) of the safety brake device 32 initiate a flow of current through the actuator element 36, with the result that the actuator element 36 initiates a braking operation in that the actuator element 36 acts on the proper functionality (i.e. the rotation) of the shaft 26 and brakes or stops the latter.

FIG. 2 also shows a first gear wheel 38, which is arranged on the motor shaft 24 and meshes with a second gear wheel 40 arranged on the shaft 26. In this way, the first gear wheel 38 and second gear wheel 40 form a safety clutch and a transmission stage. In particular, the safety clutch protects the motor 22 from damage that can be caused by blocking of the machining tool. Furthermore, by means of the safety clutch, the mass and energy to be braked during a braking operation can be reduced in that the motor shaft 24 is decoupled from the shaft 26. In this way, a particularly short braking time can be allowed. In the exemplary embodiment illustrated, the safety clutch is provided to decouple the motor shaft from the shaft 26 when a threshold value of the transmitted torque of at least 5 Nm, at most 12 Nm, preferably 10 Nm, is exceeded.

The safety brake device 32 also comprises a brake device 42 for braking the machining tool 28 driven by means of the motor 22 via the shaft 26 when a user approaches or comes into contact with the machining tool 28. The brake device 42 is in the form of an at least two-part claw clutch with a first claw-clutch part 44 and a second claw-clutch part 46, wherein the first claw-clutch part 44 is arranged on the shaft 26 so as to allow essentially no relative rotation and so as to be axially movable. The second claw-clutch part 46 is arranged so as to allow essentially no relative rotation, in particular so as to be substantially immovable, with respect to the power tool, i.e. with respect to the motor housing 12. The first claw-clutch part 44 and the second claw-clutch part 46 each have more than one toothing element 48, which are provided to be engaged with one another during a braking operation (cf. FIG. 3) and in this way to brake, in particular stop, rotation of the shaft 26.

During a braking operation, the first claw-clutch part 44 is moved axially along the shaft 26 (in the direction 100) in the direction of the second claw-clutch part 46. As a result of the axial movement of the first claw-clutch part 44 toward the second claw-clutch part 46, the first claw-clutch part 44 and second claw-clutch part 46 are coupled together, i.e. the clutch is closed. The toothing elements 48 of the first claw-clutch part 44 and of the second claw-clutch part 46 consequently engage in one another and form a form fit. On account of the form fit, a torque directed counter to the rotation of the output shaft acts between the first claw-clutch part 44 and second claw-clutch part 46. Consequently, the rotation of the output shaft and of the first claw-clutch part 44 is braked, in particular stopped or blocked.

In the exemplary embodiment in FIG. 2, the first claw-clutch part 44 is moved axially by means of the actuator element 36. The actuator element 36 is in the form of a lifting unit here, which, triggered by a flow of current through the lifting unit, performs a lever movement, wherein the first claw-clutch part 44 is moved in the axial direction 100. The lever movement takes place in a time of less than 5 ms, in particular less than 1.5 ms.

In FIG. 3, the brake device 42 is illustrated in an enlarged manner and in a manner reduced to the essential components. The brake device 42 has at least a first claw-clutch part 44 and a second claw-clutch part 46. The two claw-clutch parts 44, 46 have toothing elements 48 between which recesses 50 are located in each case. The ratio of the number α of the toothing elements 48 of the first claw-clutch part 44 to the number α of the toothing elements 48 of the second claw-clutch part 46 is one (same number, in each case eight). A maximum angular spacing $\Delta_{max}$ of mutually adjacent toothing elements 48 of the first claw-clutch part 44 and of the second claw-clutch part 46 is determined depending on a maximum rotational speed of the shaft 26. The maximum rotational speed of the shaft 26 in the exemplary embodiment described is 5000 revolutions per minute. The maximum angular spacing $\Delta_{max}$ is given here in accordance with the function $\Delta_{max}$=rps·360°·Δt, wherein a braking duration Δt to be tolerated at a maximum (from the triggering of the actuator element) is intended to be less than 1.5 milliseconds. Accordingly, the resulting maximum angular spacing $\Delta_{max}$ of mutually adjacent toothing elements 48 of the first claw-clutch part 44 and of the second claw-clutch part 46 is 45° in each case.

Furthermore, the number α of the toothing elements 48 of the first claw-clutch part 44 and of the second claw-clutch part 46 is given in accordance with the function $$\alpha = \sqrt[\gamma]{\varepsilon/rpm},$$

with the constants γ=1.377 and ε=79606, such that the resulting number (rounded) is eight. The width β (maximum width in the direction of revolution or direction of rotation) of the toothing elements 48 of the first claw-clutch part 44 and of the second claw-clutch part 46 is defined depending on the number (eight) of the toothing elements 48 and, according to the function $\beta=\theta\cdot\alpha^{-\sigma}$ with θ≅218 and σ≅1.311, is about fifteen degrees.

The invention claimed is:

1. A safety brake device for a power tool for braking a machining tool driven by means of a motor via an output shaft, comprising:
   at least one brake device configured as an at least two-part claw clutch, the at least two-part claw clutch including
      a single first claw-clutch part, and
      a single second claw-clutch part, wherein:
   the single first claw-clutch part is arranged on the output shaft so as to allow essentially no relative rotation between the single first claw-clutch part and the output shaft when the output shaft is rotating;
   the single second claw-clutch part is configured to allow essentially no relative rotation with respect to a housing of the power tool;
   the single first claw-clutch part has a first plurality of toothing elements;
   the single second claw-clutch part has a second plurality of toothing elements;
   the first and second claw-clutch parts are configured to move from a first position whereat the first and second plurality of toothing elements are not engaged to a second position whereat the first and second plurality of toothing elements engage with one another during a braking operation to stop rotation of the output shaft; and
   a maximum angular spacing $\Delta_{max}$ of mutually adjacent toothing elements of at least one of the first plurality of toothing elements and the second plurality of toothing elements was designed based upon a maximum rotational speed of the output shaft.

2. The safety brake device as claimed in claim 1, wherein:
   the maximum angular spacing $\Delta_{max}$ of the mutually adjacent toothing elements is given in accordance with the function rps·360°·Δt=$\Delta_{max}$;
   "rps" is the maximum rotational speed per second;
   "Δt" is a maximum braking duration; and
   Δt≤5 milliseconds.

3. The safety brake device of claim 2, wherein Δt≤3 milliseconds.

4. The safety brake device of claim 3, wherein Δt≤1.5 milliseconds.

5. The safety brake device as claimed in claim 1, wherein a ratio of the number of the toothing elements of the first plurality of toothing elements and of the second plurality of toothing elements is an integer.

6. The safety brake device as claimed in claim 5, wherein the integer is 1.

7. The safety brake device as claimed in claim 1, wherein a maximum width of the toothing elements of at least one of the first plurality of toothing elements and of the second plurality of toothing elements is determined depending on a number (a) of the toothing elements in the at least one of the first plurality of toothing elements and second plurality of toothing elements.

8. The safety brake device as claimed in claim 7, wherein:
the maximum width of the toothing elements of the at least one of the first plurality of toothing elements and of the second plurality of toothing elements is given in accordance with the function $\beta = \theta \cdot \alpha^{-\sigma}$;
$\theta \cong 218$; and
$\sigma \cong 1.311$.

9. A portable power tool, comprising:
an output shaft operably coupled to a motor; and
at least one brake device configured as an at least two-part claw clutch, the at least two-part claw clutch including
a single first claw-clutch part, and
a single second claw-clutch part, wherein:
the single first claw-clutch part is arranged on the output shaft so as to allow essentially no relative rotation between the single first claw-clutch part and the output shaft when the output shaft is rotating;
the single second claw-clutch part is configured to allow essentially no relative rotation with respect to a housing of the power tool;
the single first claw-clutch part has a first plurality of toothing elements;
the single second claw-clutch part has a second plurality of toothing elements;
the first and second claw-clutch parts are configured to move from a first position whereat the first and second plurality of toothing elements are not engaged to a second position whereat the first and second plurality of toothing elements engage with one another during a braking operation to stop rotation of the output shaft; and
a maximum angular spacing $\Delta_{max}$ of mutually adjacent toothing elements of at least one of the first plurality of toothing elements and the second plurality of toothing elements was designed based upon a maximum rotational speed of the output shaft.

10. A safety brake device for a power tool for braking a machining tool driven by means of a motor via an output shaft, comprising:
at least one brake device configured as an at least two-part claw clutch, the at least two-part claw clutch including
a single first claw-clutch part, and
a single second claw-clutch part, wherein:
the single first claw-clutch part is arranged on the output shaft so as to allow relative rotation between the single first claw-clutch part and the output shaft of less than 15°;
the single second claw-clutch part is configured to allow relative rotation with respect to a housing of the power tool of less than 30°;
the single first claw-clutch part has a first plurality of toothing elements;
the single second claw-clutch part has a second plurality of toothing elements;
the first and second claw-clutch parts are configured to move from a first position whereat the first and second plurality of toothing elements are not engaged to a second position whereat the first and second plurality of toothing elements engage with one another during a braking operation to stop rotation of the output shaft; and
a maximum angular spacing $\Delta_{max}$ of mutually adjacent toothing elements of at least one of the first plurality of toothing elements and the second plurality of toothing elements was designed based upon a maximum rotational speed of the output shaft.

* * * * *